United States Patent
Davies

(10) Patent No.: US 8,255,293 B1
(45) Date of Patent: Aug. 28, 2012

(54) PRODUCT CATALOG DYNAMICALLY TAILORED TO USER-SELECTED MEDIA CONTENT

(75) Inventor: Benedict John Davies, London (GB)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/270,183

(22) Filed: Oct. 10, 2011

(51) Int. Cl.
*G06Q 30/00* (2006.01)

(52) U.S. Cl. ............... 705/27.1; 705/14.49; 705/14.72

(58) Field of Classification Search ........... 705/14.66, 705/14.67, 14.72, 27.1, 27.2, 14.49
See application file for complete search history.

(56) References Cited

U.S. PATENT DOCUMENTS

| | | | |
|---|---|---|---|
| 5,708,845 A * | 1/1998 | Wistendahl et al. | 715/202 |
| 5,721,827 A * | 2/1998 | Logan et al. | 709/217 |
| 7,013,290 B2 * | 3/2006 | Ananian | 705/26.42 |
| 7,174,306 B1 * | 2/2007 | Haseltine | 705/26.35 |
| 7,249,067 B2 * | 7/2007 | Doerksen et al. | 705/27.2 |
| 7,428,504 B2 * | 9/2008 | Song | 705/26.62 |
| 7,725,362 B2 * | 5/2010 | Weathers, Jr. | 705/26.8 |
| 8,150,743 B2 * | 4/2012 | Brown | 705/27.2 |
| 2001/0049625 A1 * | 12/2001 | Mowry | 705/14 |
| 2007/0006267 A1 * | 1/2007 | Walker et al. | 725/60 |
| 2007/0039020 A1 * | 2/2007 | Cansler et al. | 725/37 |
| 2007/0078774 A1 * | 4/2007 | Brown | 705/58 |
| 2007/0276721 A1 * | 11/2007 | Jackson | 705/10 |
| 2007/0300263 A1 * | 12/2007 | Barton et al. | 725/60 |
| 2008/0162305 A1 * | 7/2008 | Rousso et al. | 705/27 |
| 2009/0006208 A1 * | 1/2009 | Grewal et al. | 705/14 |
| 2011/0153451 A1 * | 6/2011 | Bitz et al. | 705/26.7 |
| 2011/0162002 A1 * | 6/2011 | Jones et al. | 725/32 |
| 2011/0214143 A1 * | 9/2011 | Rits et al. | 725/34 |
| 2011/0221962 A1 * | 9/2011 | Khosravy et al. | 348/563 |
| 2011/0276882 A1 * | 11/2011 | Buehler et al. | 715/727 |

OTHER PUBLICATIONS

Anon., "Customized Catalogs Offered on CD-ROM," Interactive Facts, vol. 1, No. 16, Jul. 4, 1994.*
Key, P., "Safeguard Spins its Web," Philadelphia Business Journal, vol. 18, No. 52, p. 15, Feb. 4, 2000.*

* cited by examiner

*Primary Examiner* — Nicholas D Rosen
(74) *Attorney, Agent, or Firm* — Turocy & Watson, LLP

(57) ABSTRACT

Systems and methods for media-oriented product catalog creation are disclosed herein. Media content displayed or otherwise selected by a content consumer can be identified. Accordingly, products or services depicted by the media content can be compiled into a dynamic product catalog. The catalog can include a description of the products or services as well as associated contextual references to the media content, such as a screen capture or video clip that depicts one or more portions of the media content in which the product or service was featured.

30 Claims, 11 Drawing Sheets

PRODUCT CATALOG DYNAMICALLY TAILORED TO USER-SELECTED MEDIA CONTENT

TECHNICAL FIELD

This application generally relates to constructing a product catalog, and more particularly to product catalogs generated based upon an individual's preference(s) regarding media content.

BACKGROUND

Television, streaming video, or other media content frequently includes depictions of products or services that are interesting to content consumers. However, such products or services are not usually central to the narrative or plot of the media content, but rather exist as setting or background elements. Directing ones attention to products or services depicted in media content can, in some instances, detract from enjoyment of the media production. However, many products or services depicted in media content, including those that content consumers find interesting, might be easily overlooked otherwise.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its purpose is to present some concepts of the specification in a simplified form as a prelude to the more detailed description that is presented in this disclosure.

Systems and methods disclosed herein relate to dynamic construction of a media-oriented product catalog. A collection component identifies media content selected by a content consumer. A product component identifies a product or service depicted by the media content. In response, a catalog component compiles a catalog that includes a description of the product or service and an associated contextual reference to the media content.

Also disclosed herein is a product catalog construction method including employing a microprocessor to execute computer executable components stored within a memory to perform the following: identifying media content selected by a content consumer; identifying a product or service depicted by the media content; including in the catalog a description of the product or service and an associated contextual reference to the media content; and presenting the catalog to the content consumer. The method may include utilizing a speech recognition technique to identify the product or service depicted by the media content. The method may also include utilizing a text recognition technique to identify the product or service depicted by the media content. The method may further include utilizing an image recognition technique to identify the product or service depicted by the media content.

Also disclosed herein is an apparatus including: a user interface associated with a user and a computer readable medium operatively coupled to the user interface, the computer readable medium encoded with computer executable components which, when executed, displays on the user interface a product catalog constructed by a remote system, the remote system including a collection component that identifies media content selected by the user; a product component that identifies an item depicted by the media content; a catalog component that creates in the catalog an indication of the item and an associated contextual reference to the media content; and a presentation component that provides the catalog to the user interface. The product component may also identify the item as a result of analysis of speech or closed captioned text included in the media content. The contextual reference may be at least one of a still image, a video clip, an audio clip, or a captioned text clip of the media content in which the item is depicted. The catalog component may further include in the catalog an annotation feature associated with feedback from the user. The presentation component may share the catalog with a contact of the content consumer. The catalog component may further construct a theme catalog based upon a filter associated with at least one of one or more cast members of the media content, one or more crew members of the media content, or subject matter of the media content.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Overview

Figure 1:
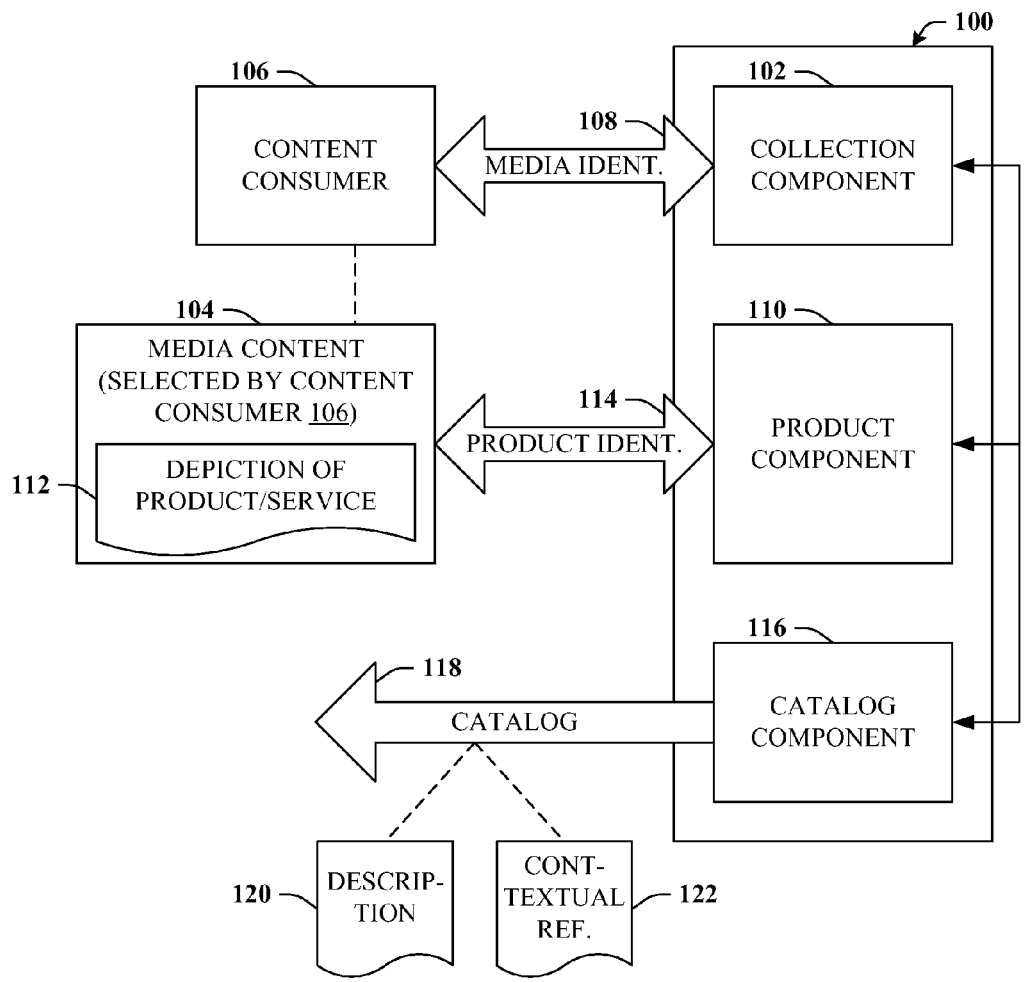
FIG. 1 illustrates a high-level functional block diagram of an example media-oriented product catalog creations system.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing the subject disclosure.

As used herein, the term "item" is intended to relate to either a product or as service. Video, television, streaming video and so forth frequently depict items that appeal to users. Systems and methods disclosed herein relate to dynamically constructing a catalog of items (e.g., products or services) depicted in media content consumed or otherwise selected by a user. For example, systems and methods disclosed herein may, gather additional information about the depicted item and/or about purchasing the depicted item, provide an annotation about the depicted items (e.g., an indication that the user owns the item or would like to own it), or the like.

A product catalog can be constructed in a manner that does not detract or minimizes detracting from an experience associated with media content. When a product or service is depicted in a video or other media content, that product or service can be added to a visually rich and fully interactive catalog. The product or service can be identified when, e.g., mentioned in direct dialog or closed captioned text, visually recognized with image recognition techniques, or supplied as metadata or other data by the creators or providers of the media content. Regardless of how the product or service is identified, such can be compared to one or more product databases to obtain additional information or features. By way of illustration and not limitation, the identified items depicted in the media content can be, e.g., food and drink consumed or discussed by the cast along with recipes if appropriate; furniture and fittings such as wallpaper, curtains, ornaments, domestic appliances, lighting, etc.; clothing or other apparel; the score or other musical or audible productions; vehicles used; destinations visited or mentioned and so on. Catalogs can be assembled over many different time spans as well, for example, on a show-by-show basis, across an evening's viewing, or across all episodes of a series. Moreover, one or more catalog can be provided to a user in real-time, in some cases even prior to displaying the media content, or periodically, e.g., to provide a weekly compilation of products or services depicted in media content displayed to the user during that week. A particular catalog can be constructed or formatted for display on the same viewing screen that displays the media content (e.g., toggled or side-by-side) or on a secondary and/or companion screen (e.g., a phone, tablet, laptop, e-reader, etc.).

The catalog can be presented as a fully indexed and searchable compilation. Moreover, the catalog can provide rich context in which a particular product or service was presented. For example, the catalog can display a screenshot or a timecode from a scene from the media content in which a particular product or service was featured. Additionally, the catalog can support convenient access to purchase products or services included in the catalog, and can allow opportunities for other interactions such as marking which items depicted in the media content a user already owns or in the case of a vacation destination has already experienced. The catalog or portions thereof can also be shared at the user's request/with the user's consent with others, such as friends, followers, or other contacts associated with the user. Further, the catalog can be constructed or indexed or filtered according to a particular theme such as a "Miami Vice" themed house makeover or a "Glee" themed wedding. The catalog can also provide a platform for advertisers to provide value-adds such as in-depth details about the products or services depicted, celebrity endorsements, or special offers relating to featured products or services or similar products or services.

Example Product Catalog Creation

Referring now to FIG. 1, a product catalog creation system 100 is depicted. System 100 can include a memory that stores computer executable components and a processor that executes computer executable components stored in the memory, examples of which can be found with reference to FIG. 10. In addition, system 100 can include collection component 102 that can identify media content 104 selected by content consumer 106. As non-limiting examples, media content 104 can be a television show or program, a feature-length film, a commercial or advertisement, a short, a video on a video hosting website, etc. Media content 104 can be delivered by way of, for example, streaming video, television broadcast, or from an optical storage medium.

Identification of media content 104 is illustrated by media identification 108, which can be based upon a transaction or interaction associated with content consumer 106. For example, media identification 108 can occur when content consumer 106 displays or otherwise consumes media content 104, or selects media content 104 from a list or the like. Thus, product catalog creation can be tailored to the viewing habits of content consumer 106, and by proxy to the likes or interests of content consumer 106.

System 100 can also include product component 110 that can identify (denoted product identification 114) a product or service depicted by media content 104, which is illustrated as depiction of product/service 112. It is understood that depiction of product/service 112 need not be a direct depiction such as visually appearing in media content 104, but can be indirectly depicted such as based upon a verbal account by an actor, which is further detailed with reference to FIG. 2.

System 100 can further include catalog component 116 that can compile catalog 118. Catalog 118 can include description 120 of the product or service (e.g., an enumeration of, or reference to, the product or service) and an associated contextual reference 122 to media content 104. Various non-limiting examples of contextual reference 122 are provided in connection with FIG. 3.

Figure 2:
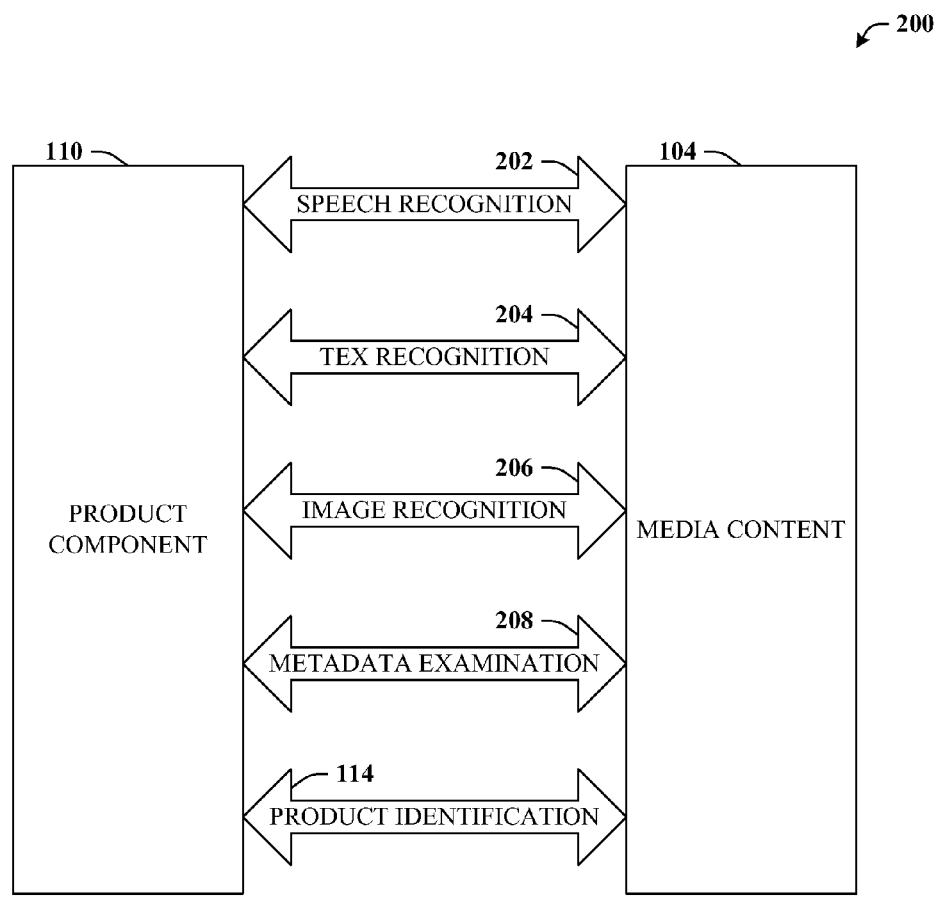
FIG. 2 illustrates a functional block diagram of an example product component with non-limiting examples of techniques to identify products or services.

Referring now to FIG. 2, system 200 is illustrated. System 200 illustrates product component 110 and provides several non-limiting examples of techniques employed to perform product identification 114. For example, product component 110 can employ speech recognition 202 techniques or other sound recognition techniques (e.g., based upon hidden Markov models, dynamic time warping models, acoustic models, music audio mining models, etc.) to identify the product or service depicted in media content 104. Product component 110 can also employ text recognition 204 techniques (e.g., optical character recognition (OCR), music OCR, etc.) to identify the product or service. For instance, speech recognition 202 might first convert scripted dialog or music vocals from media content 104 into text or text-based representation, so text recognition 204 can operate on the converted text. As another example, text recognition 204 can operate upon closed caption or subtitle data.

In addition, product component 110 can employ image recognition 206 techniques to identify the product or service (e.g., based upon object recognition techniques, content-based image retrieval, etc.). As another example, product component 110 can perform product identification 114 to identify the product or service based upon data (e.g., metadata) included in or associated with media content 104, which is denoted metadata examination 208. It is understood the above are intended merely as examples and other examples are possible. For instance, product component 110 can employ sound or music recognition techniques to identify a song or musical score of media content 104, which can be included as a function of speech recognition 202 in this illustration.

Figure 3:
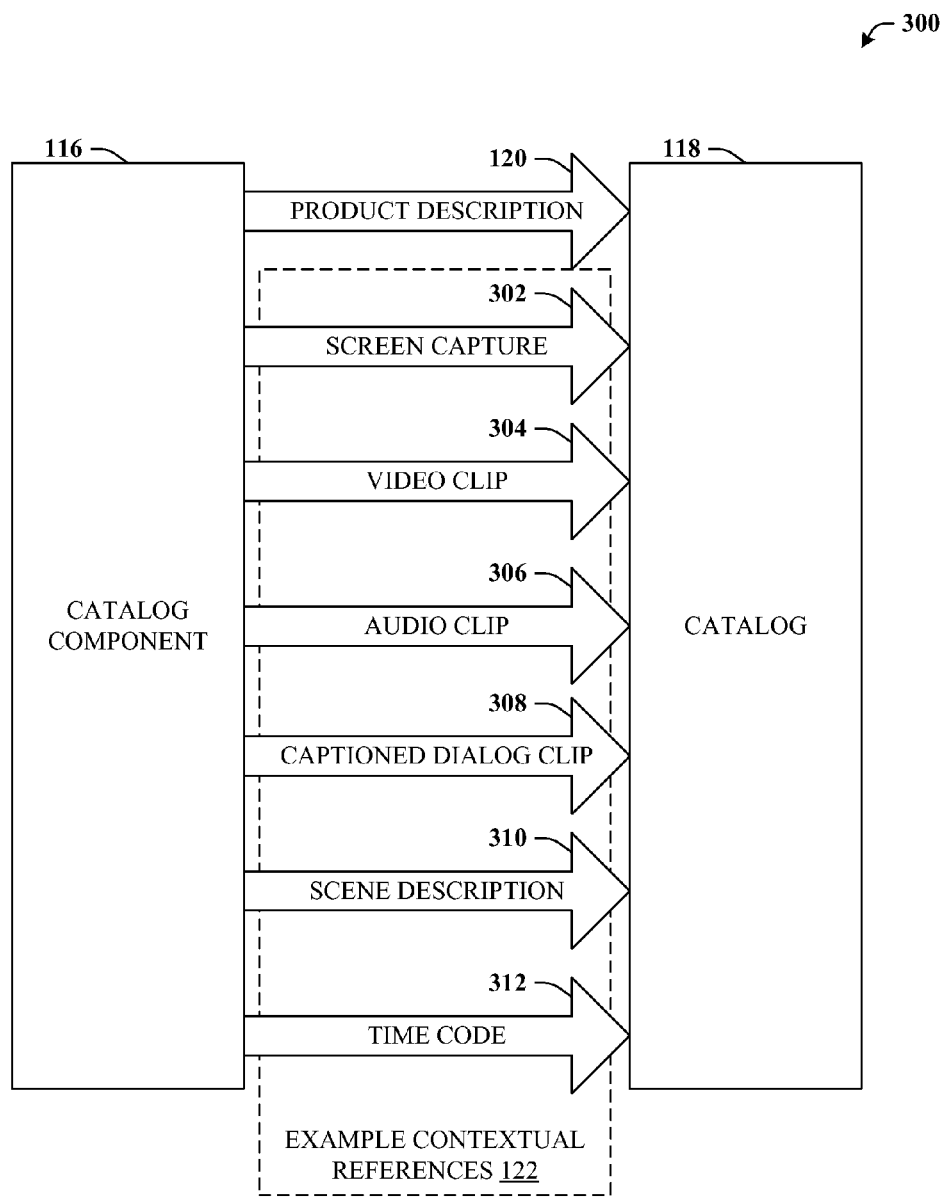
FIG. 3 illustrates a functional block diagram of an example catalog component with non-limiting examples of elements or features that can be included in the catalog.

Turning now to FIG. 3, system 300 is depicted. System 300 illustrates catalog component 116 and provides numerous non-limiting examples of elements or features that can be included in catalog 118. As noted, catalog component 116 can include in catalog 118 product description 120 as well as one or more contextual references 122. For example, contextual reference 122 can be screen capture 302 or video clip 304 of media content 104 that depict the product or service. Hence, contextual reference 122 can be a still image characterized as screen capture 302 or a portion of media content 104 characterized as video clip 304.

For example, consider the case in which content consumer 106 displays or otherwise selects the film "Top Gun." Collection component 102 can identify the film and product component 110 can identify products or services depicted by the film. One such item can be the leather flight jacket worn by the protagonist in several scenes. As a result, catalog component 116 can include product description 120 such as, e.g., "leather flight jacket" or "Top Gun Leather jacket" in catalog 118 as well as one or several screen shots or brief video segments in which the jacket was depicted in the film.

Such can result in a visually rich catalog capable of conveying both the appeal of the product or service and the contextual significance to the underlying media content 104. All or a subset of the images or videos can be embedded in catalog 118 or reference linked to by catalog 118. For instance, a particularly memorable image or video segment that highlights the jacket can be embedded in catalog 118, while numerous other images or video segments that depict the jacket can be linked-to instead of more fully presented in catalog 118.

In addition to the two examples of contextual reference 122 provided supra, contextual reference 122 can be audio clip 306 (e.g., a memorable line of dialog by an actor or narrator) or captioned dialog clip 308 (e.g., a printed portion of dialog) of media content 104 that depicts the product or service. Contextual reference 122 can also be a description of a scene included in media content 104 that depicts the product or service, which is denoted scene description 310. Scene description 310 can be, e.g., portions of a screenplay associated with media content 104 that describe the setting. In addition, contextual reference 122 can be timecode 312. For example, one or more running times of media content 104 at which the product or service is depicted.

Figure 4:
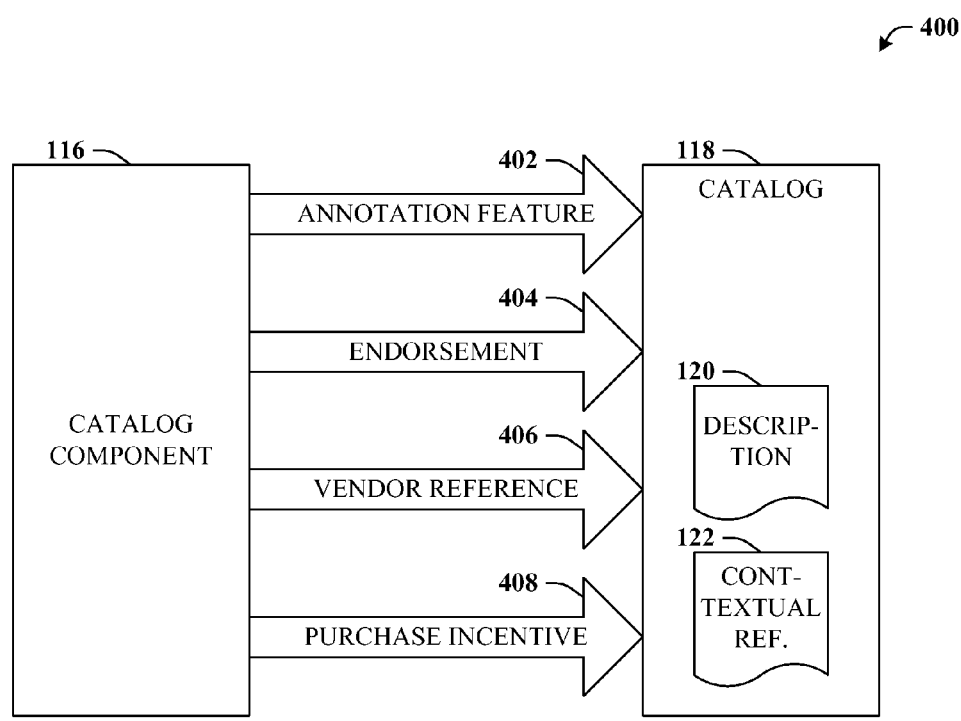
FIG. 4 illustrates further detail associated with an example catalog component relating to additional features or elements that can be included in a catalog.

Referring to FIG. 4, system 400 is depicted. System 400 illustrates further detail associated with catalog component 116 relating to additional features or elements that can be included in catalog 118. As previously described, catalog 118 can include description 120 and contextual reference 122. In one embodiment, catalog component 116 can further include in catalog 118 annotation feature 402 associated with the product or service. By way of illustration and not limitation, annotation feature 402 can support input that indicates content consumer 106 owns or has purchased the product or service or a similar product or service. For instance, content consumer 106 can note via annotation feature 402 that he or she has a leather flight jacket just like the one in media content 104 or that he or she has been to a location (e.g., San Diego) where a scene takes place in media content 104, a location discussed by or visited by a character in media content 104, or a location associated with an actor staring in media content 104. As another example, annotation feature 402 can support input that indicates an opinion of content consumer 106 about the product or service or a similar product or service. For instance, in this case, annotation feature 402 can enable content consumer 106 to provide input like, "I like that motorcycle" or "putting those shoes on my wishlist." The input may come via the user clicking on one or more icons or buttons on a user interface (e.g., a "+1" button, a "Add to Wishlist" button, a thumbs-up button, stars, a happy face or the like).

In one embodiment, catalog component 116 can further include in catalog 118 endorsement 404 associated with the product or service. Endorsement 404 can be, e.g., a celebrity endorsement or other endorsement by members of a cast or crew of media content 104. In addition, endorsement 404 can be from other users or owners of the product or service (or those who have experience with) the product or service or friends/contacts of the user. Catalog component 116 can further include in catalog 118 a reference to a vendor (e.g., vendor reference 406) that provides the product or service or a similar product or service. For example, catalog 118 can include a link to one or more vendor websites that offer the product or service for sale to market consumers. Catalog component 116 can further include in catalog 118 purchase incentive 408. Purchase incentive 408 can be any suitable incentive provided in connection with a purchase of the product or service or a similar product or service. For example, purchase incentive 408 can be a coupon, a voucher, etc.

Figure 5:
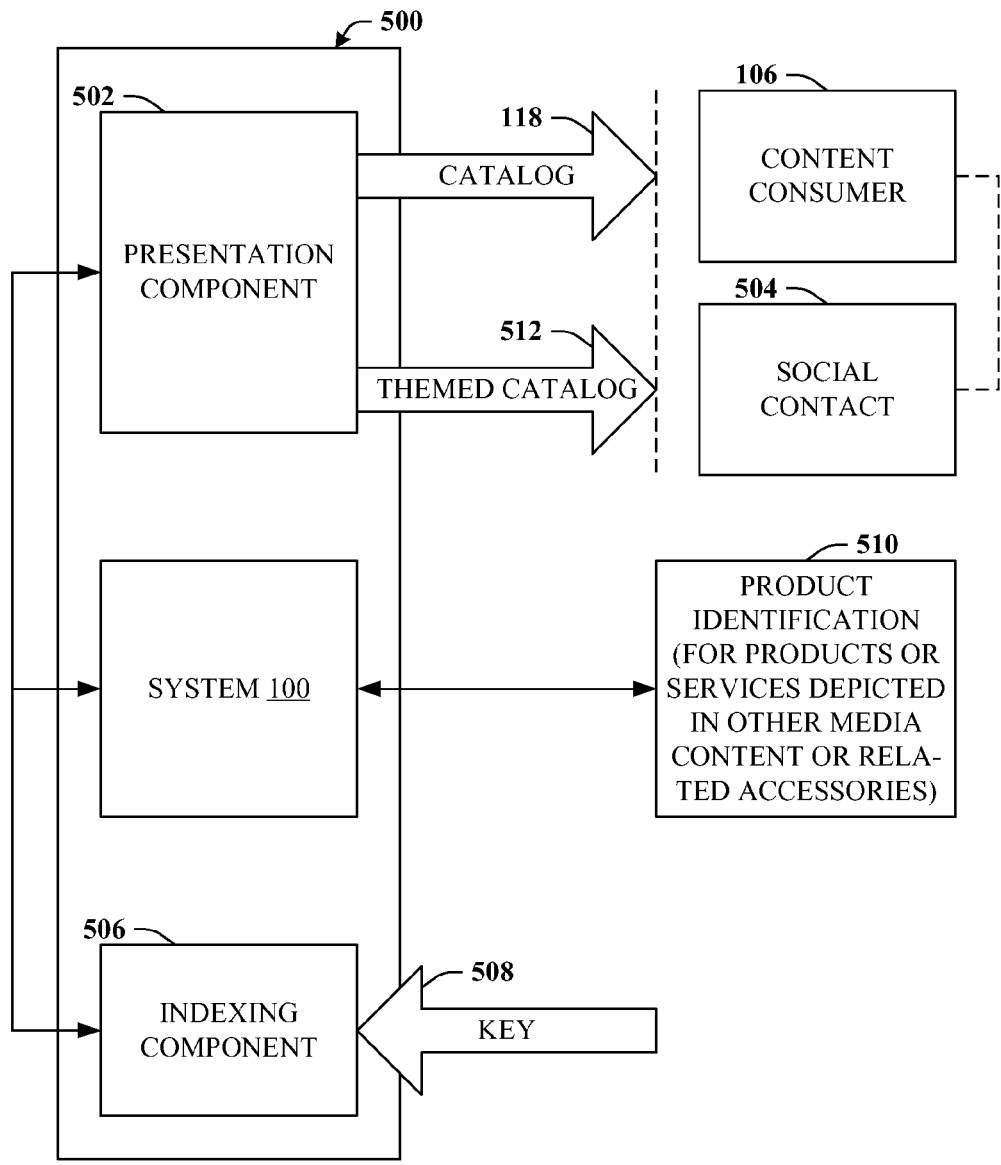
FIG. 5 illustrates a high-level functional block diagram of an example media-oriented product catalog creation system with presentation and indexing features.

With reference now to FIG. 5, system 500 is depicted. System 500 illustrates additional features or aspects in connection with product catalog creation. System 500 can include all or a portion of the components described in connection with system 100 or otherwise described herein. In addition, system 500 can include presentation component 502 that can deliver and/or present catalog 118 (or a subset of catalog 118) to content consumer 106. Thus, catalog 118 can be constructed in a manner that is tailored to the shows or other media content 104 selected by content consumer 106, and presentation component 502 can provide the final compilation, or some desired portion thereof, to content consumer 106. If media content 104 is available to system 100 or other suitable components detailed herein, then catalog 118 can be provided immediately upon selection of media content 104, potentially prior to or during display by content consumer 106. For example, catalog 118 can be presented along with media content 104, so that content consumer 106 can toggle between media content 104 and catalog 118. As another example, catalog 118 can be presented in a secondary frame, picture, window, or different portion of the same display device, as an overlay, or presented to a display other than the device used for media content 104, such as a phone, tablet, e-reader, laptop, etc. In one embodiment, catalog 118 can be provided immediately upon conclusion of the display or presentation of media content 106. In another embodiment, catalog 118 can be provided according to a schedule, for example, weekly, monthly, etc.

It is understood that systems 100 or 500 or other components described herein can be implemented in either a centralized or a distributed manner. For example, in one embodiment, all or a portion of systems 100 or 500 can be included in a server such as a content server. In another embodiment, all or a portion of systems 100 or 500 can be included in a client device associated with content consumer 106. Thus, depending upon the particular implementation, presentation component 502 can deliver catalog 118 to content consumer 106 over a communications network or directly to a user interface or display of a device associated with content consumer. Presentation component 502 can additionally or alternatively deliver catalog 118 via email or a social network platform, in connection with a suitable viewer or application (such as but not limited to a mobile app), or streamed, broadcast, or read from a storage medium (e.g., an optical disk, hard-drive, or storage mediums of a cloud) in conjunction with media content 104.

In one embodiment, presentation component 502 can deliver catalog 118 to one or more social contact 504 of content consumer 106. For example, friends, family, followers, or other potentially interested parties can, with proper authorization from both content consumer 106 and social contact 504, receive catalog 118 associated with content consumer 106 or certain compilations or portions designated for sharing. Such can be particularly interesting when content consumer 106 has further personalized catalog 118, such as by including one or more annotation features 402 described in connection with FIG. 4.

System 500 can also include indexing component 506 that can index catalog 118 according to key 508. Key 508 can represent a variety of data pivots or filters. For example, key 508 can be one or more cast member of media content 104 (e.g., a famous actor or actress featured in media content 104). Key 508 can also be one or more crew member (e.g., the director of media content 104), subject matter of media content 104 (e.g., a particular genre or topic), a type or category of product or service, and so on. Accordingly, in one embodiment, catalog component 116 can include in catalog 118 product identification 510. Product identification 510 can relate to identification of products or services depicted in other media content, with a relationship provided by key 508. It is understood that if multiple keys 508 are selected, a resultant catalog can be compiled based upon a union operation with respect to two or more keys, an intersection operation with respect to two or more keys or a combination thereof.

For example, consider the scenario in which content consumer 106 displays the film "Top Gun" and later reviews an associated catalog 118 that includes the leather flight jacket worn in that film by actor, Tom Cruise. Content consumer 106 can then choose to select the actor "Tom Cruise" as a first key 508 and select "apparel" as a second key 508. In response, catalog component 116 can construct a new catalog (e.g., catalog 118) that includes the leather flight jacket from "Top Gun" as well as the sun glasses Tom Cruise wore in "Risky Business." It is understood that although the sunglasses from "Risky Business" need not be displayed or otherwise selected by content consumer 106 (who actually selected in this example "Top Gun"). Rather, the sunglasses or other suitable products or services can be obtained as a result of product identification 510 due to the relationships derived from one or multiple keys 508. Accordingly, product identification 510 can identify accessories or related products or services, even if those accessories or other items were not featured in media content 106. In a similar manner, catalog component 116 can employ one or more keys 508 to construct themed catalog 512. Themed catalog 512 can also be delivered to content consumer 106 or shared with social contact 504. For example, themed catalog 512 might be humorous quips from the television show "House" or the actor Hugh Laurie, a "Dexter" styled Halloween haunted house, or a "Glee" themed wedding. In any case, items listed in themed catalog 512 can be depicted by various media content 104 or other suitable media content.

Figure 6:
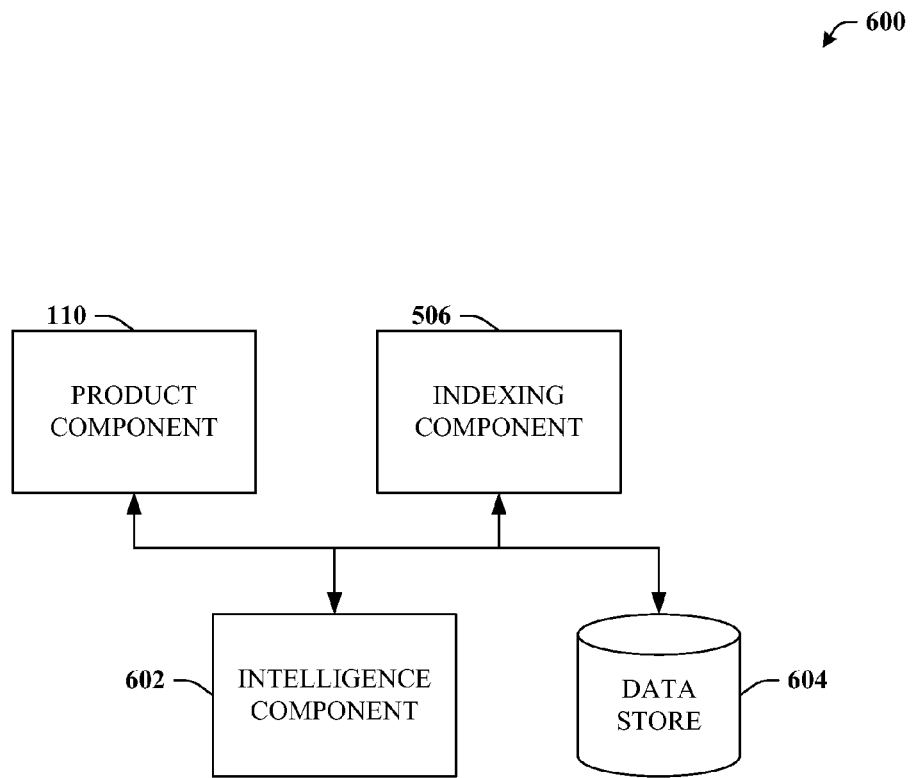
FIG. 6 illustrates a high-level functional block diagram of an example system that can provide for or aid with various inferences or intelligent determinations.

Referring now to FIG. 6, system 600 is depicted. System 600 can provide for or aid with various inferences or intelligent determinations. Generally, system 600 can include product component 110 and indexing component 506 as substantially described herein. In addition to what has been described, the above-mentioned components can make intelligent determinations or inferences.

For example, product component 110 can intelligently determine or infer suitable products or services to include in catalog 118 and/or suitable indicators or descriptions for those products or services. Likewise, indexing component 506 can also employ intelligent determinations or inferences in connection with classifying a product or service (potentially identified by product component 110) into a particular category for efficient indexing. Any of the foregoing inferences can potentially be based upon, e.g., Bayesian probabilities or confidence measures or based upon machine learning techniques related to historical analysis, feedback, and/or other determinations or inferences.

In addition, system 600 can also include intelligence component 602 that can provide for or aid in various inferences or determinations. For example, all or portions of product component 110 or indexing component 506 (as well as other components described herein) can be operatively coupled to intelligence component 602. Additionally or alternatively, all or portions of intelligence component 602 can be included in one or more components described herein. Moreover, intelligence component 602 may be granted access to all or portions of data sets described herein, such as data store 604.

Data store 604 represents one or more repositories for all or portions of data, data sets, or information described herein or otherwise suitable for use with the claimed subject matter. Data store 604 can include media content 104, catalogs 118 (potentially keyed to multiple parameters) and/or themed catalogs 512, descriptions 120, contextual references 122, annotations, endorsements 404, vendor references 406, purchase incentives 408, keys 508, product identifications 114 or 510, and so on. Data store 604 can be centralized, either remotely or locally cached, or distributed, potentially across multiple devices and/or schemas. Furthermore, data store 604 can be embodied as substantially any type of memory, including but not limited to volatile or non-volatile, solid state, sequential access, structured access, random access and so on. It is understood that all or portions of data store 604 can be included in systems 100 or 500, or can reside in part or entirely remotely from those systems 100, 500.

In order to provide for or aid in the numerous inferences described herein (e.g., inferring suitable products or services, suitable indicators, descriptions, item classifications, etc), intelligence component 602 can examine the entirety or a subset of the data to which it is granted access and can provide for reasoning about or infer states of the system, environment, etc. from a set of observations as captured via events and/or data. An inference can be employed to identify a specific context or action, or can generate a probability distribution over states, for example. The inference can be probabilistic—that is, the computation of a probability distribution over states of interest based on a consideration of data and events. An inference can also refer to techniques employed for composing higher-level events from a set of events and/or data.

Such an inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, x=(x1, x2, x3, x4, xn), to a confidence that the input belongs to a class, such as by f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 7:
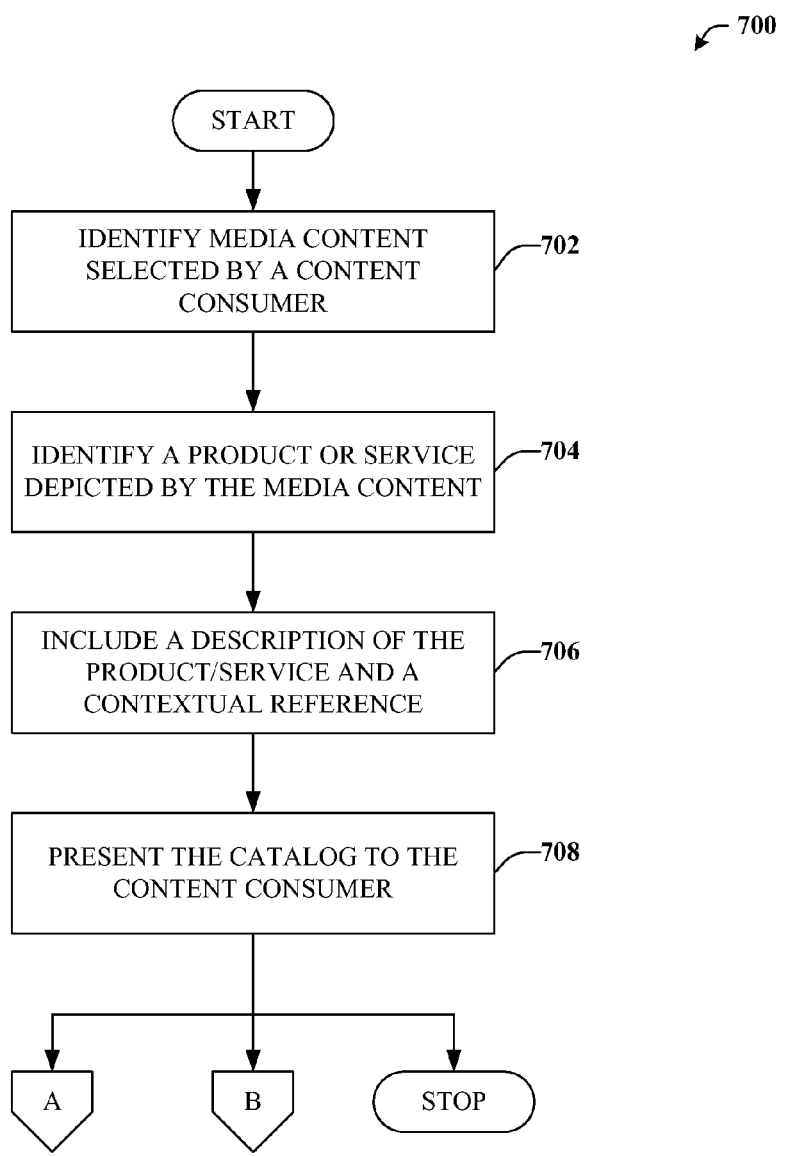
FIG. 7 illustrates an example methodology for dynamically constructing media-oriented product catalogs.

Referring now to FIG. 7, exemplary method 700 for constructing media-oriented product catalogs is depicted. Generally, at reference numeral 702, media content selected by a content consumer can be identified (e.g., by a collection component). For example, media content can be identified when, e.g., selected for display or viewing by the content consumer or when selected from a list such as a list provided for theme catalog construction.

At reference numeral 704, a product or service depicted by the media content can be identified (e.g., by a product component). It is understood that the product or service identified can be depicted by the media content in many ways, which does not require direct visual representation, but rather can include a verbal mention or description, or included in the score, etc. At reference numeral 706, a description of the product or service, such as an indicator or enumeration, can be included in the catalog (e.g., by a catalog component). Additionally, an associated contextual reference to the media content can be included in the catalog (e.g., by a catalog component). Thus, a catalog compiled from products or services depicted in a particular set or item of media content can include a description of the product or service, a contextual reference (e.g., when or how the product or service was depicted by the media content), as well as other features that are detailed with reference to FIG. 9. At reference numeral 708, the catalog can be presented to the content consumer, which can be accomplished by a presentation component transmitting the catalog to a display device associated with the content consumer, potentially via a communications network.

Figure 8:
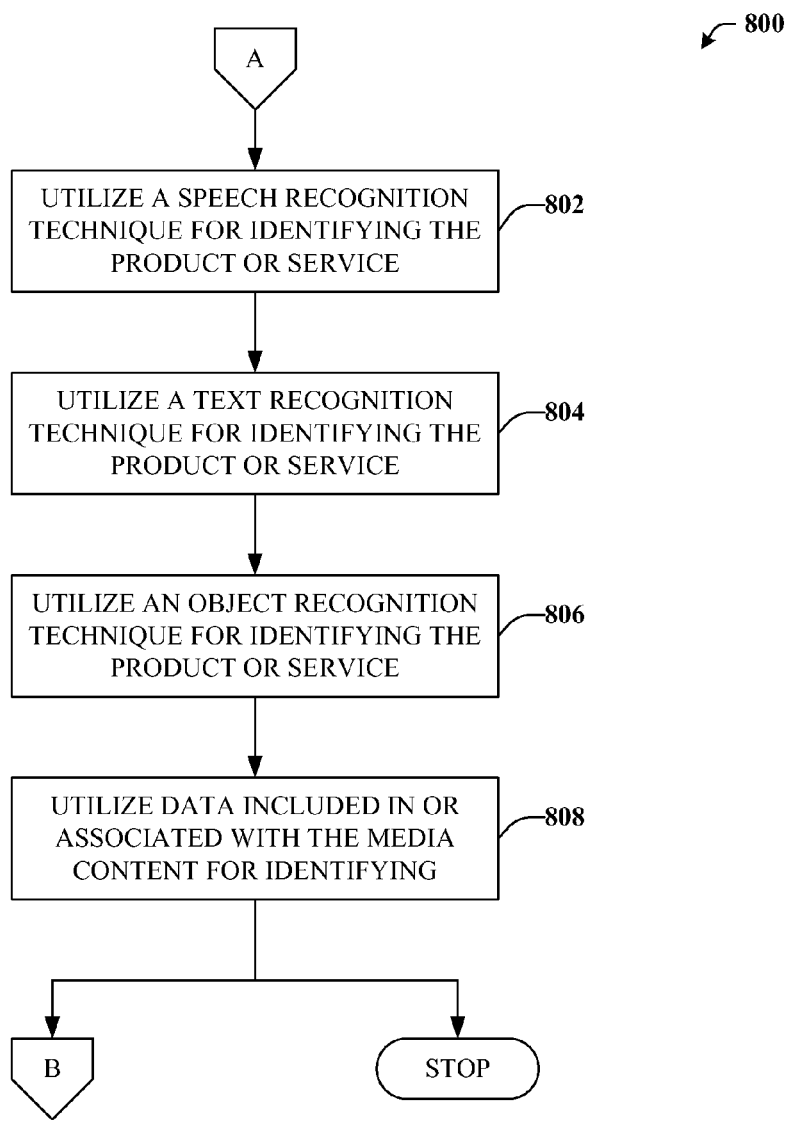
FIG. 8 illustrates an example methodology for identifying the products or services depicted in the media content.

Turning now to FIG. 8, method 800 is illustrated. Method 800 provides various non-limiting examples for identifying the products or services depicted in the media content. All or a portion of recognition techniques or other means of identifying a product or service can be performed by, for example, a product component (e.g., product component 110). At reference numeral 802, one or more speech recognition techniques can be utilized for identifying the product or service. It is understood voice or sound recognition can be utilized as well, e.g., to identify the speaker or to identify score music or other ambient sounds.

At reference numeral 804, one or more text recognition techniques can be utilized for identifying the product or service. In particular, text obtained from closed captioning or subtitles can be utilized. At reference numeral 806, one or more image recognition techniques can be utilized for identifying the product or service. Thus, in addition to identifying items discussed in dialog or the like, items that are visually depicted in the media content can be identified. At reference numeral 808, data or metadata included in or associated with the media content can be utilized for identifying the product or service. For example, a production crew can, e.g., during production, embed product data in media content or create a data file with suitable information.

Figure 9:
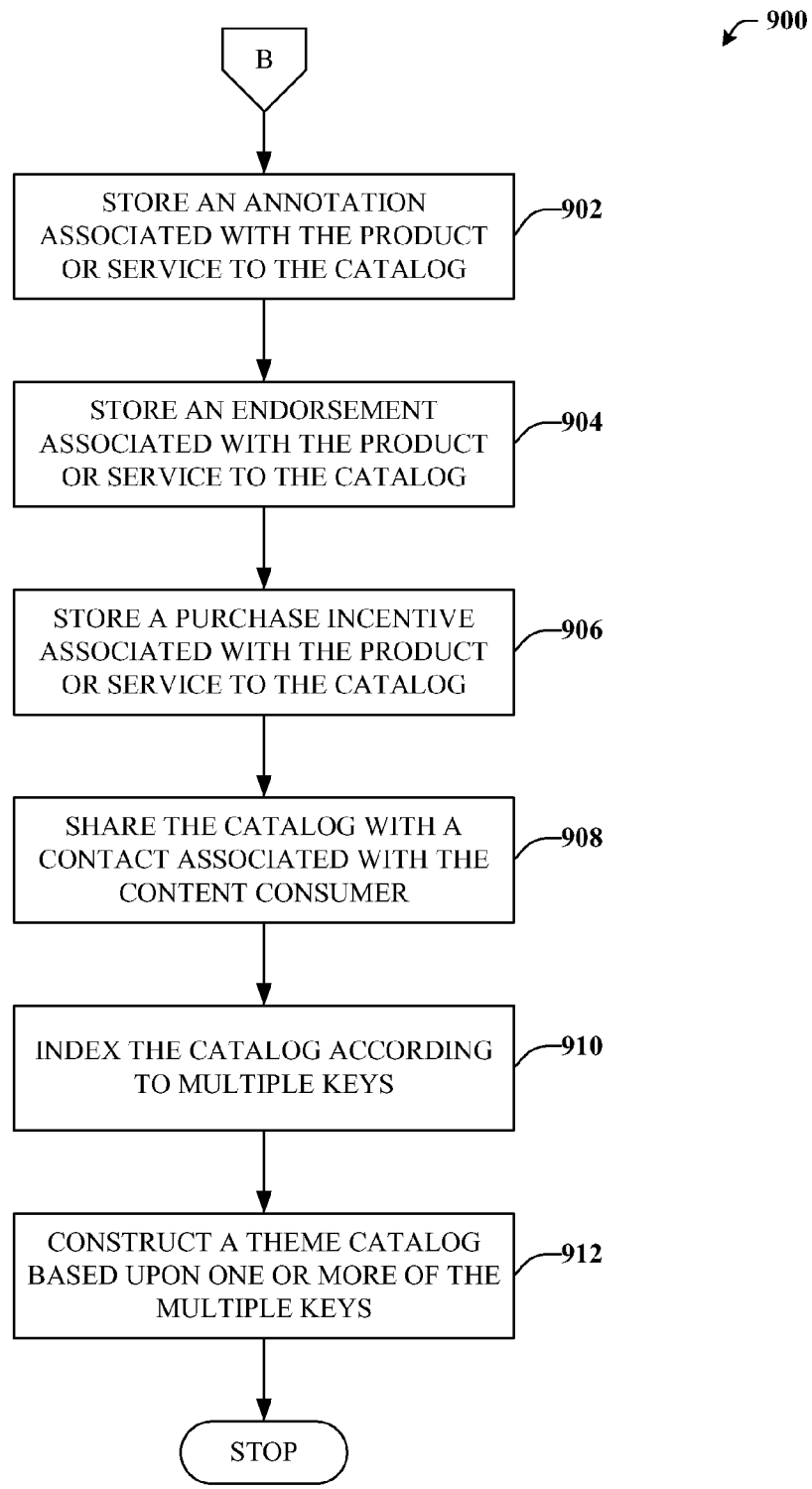
FIG. 9 illustrates an example methodology for providing additional non-limiting features or aspects in connection with catalog creation.

Referring to FIG. 9, method 900 is depicted. Method 900 provides additional non-limiting features or aspects that can be included in the catalog. At reference numeral 902, an annotation associated with the product or service can be stored to the catalog. By way of example, the annotation can be an indication the content consumer owns or has experienced the product or service. As another example, the annotation can be feedback related to the product or service, an indication of a desire for the product or service (e.g., wishlist), and so forth.

At reference numeral 904, an endorsement associated with the product or service can be stored to the catalog. The endorsement can be, e.g., a celebrity endorsement from an actor featured in the media content. At reference numeral 906, purchase incentive associated with the product or service can be stored to the catalog. The purchase incentive can be, e.g., a coupon, gift certificate, voucher, etc. that can be redeemed during purchase of the product or service, and can include a link to one or more vendor sites where the incentive can be redeemed and/or the product or service purchased. Annotations, endorsements, vendor references, purchase incentives etc. can be included in the catalog by, for example, a catalog component (e.g., catalog component 116).

At reference numeral 908, the catalog can be shared with a contact associated with the content consumer (e.g., by a presentation component). For example, with proper authorization from all relevant parties, the content consumer for which the catalog was compiled can share one or more versions of the catalog with friends, family, followers, or other contacts. At reference numeral 910, the catalog can be indexed according to multiple keys (e.g., by an indexing component). These keys can be, e.g., at least one cast member of the media content, at least one crew member of the media content, a category of the product or service, subject matter of the media content (e.g., topic or genre), etc. At reference numeral 912, a theme catalog can be constructed based upon one or more of the multiple keys.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated herein.

Figure 10:
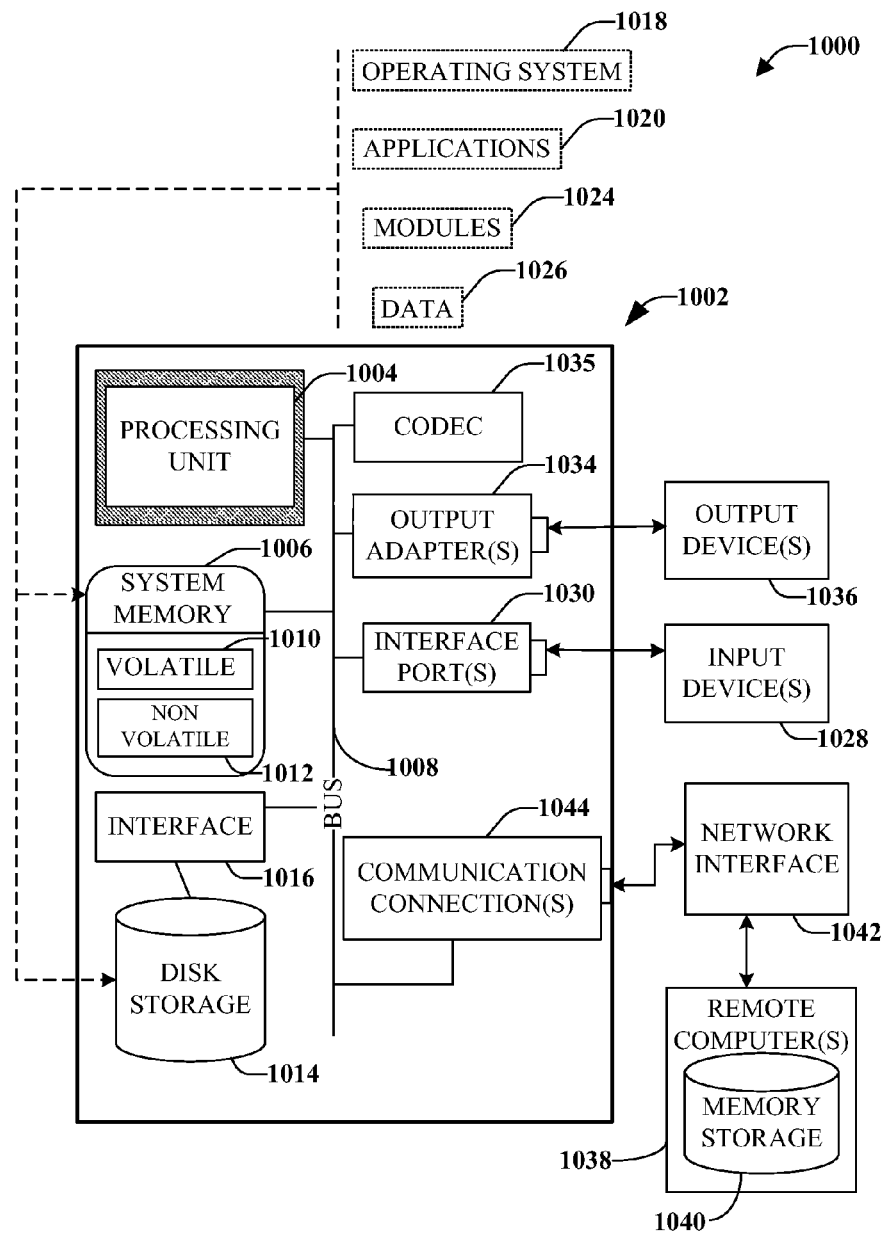
FIG. 10 illustrates an example schematic block diagram for a computing environment in accordance with the subject specification.

With reference to FIG. 10, a suitable environment 1000 for implementing various aspects of the claimed subject matter includes a computer 1002. The computer 1002 includes a processing unit 1004, a system memory 1006, a codec 1005, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1006 includes volatile memory 1010 and non-volatile memory 1012. The basic input/output system (BIOS), containing the basic routines to transfer information between elements within the computer 1002, such as during start-up, is stored in non-volatile memory 1012. In addition, according to present innovations, codec 1005 may include at least one of an encoder or decoder, wherein the at least one of an encoder or decoder may consist of hardware, a combination of hardware and software, or software. Although, codec 1005 is depicted as a separate component, codec 1005 may be contained within non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), or flash memory. Volatile memory 1010 includes random access memory (RAM), which acts as external cache memory. According to present aspects, the volatile memory may store the write operation retry logic (not shown in FIG. 10) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1002 may also include removable/non-removable, volatile/non-volatile computer storage medium. FIG. 10 illustrates, for example, disk storage 1014. Disk storage 1014 includes, but is not limited to, devices like a magnetic disk drive, solid state disk (SSD) floppy disk drive, tape drive, Jaz drive, Zip drive, LS-100 drive, flash memory card, or memory stick. In addition, disk storage 1014 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used, such as interface 1016.

It is to be appreciated that FIG. 10 describes software that acts as an intermediary between users and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems.

A user enters commands or information into the computer 1002 through input device(s) 1028. Input devices 1028 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s) 1028. Thus, for example, a USB port may be used to provide input to computer 1002, and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices and/or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

Figure 11:
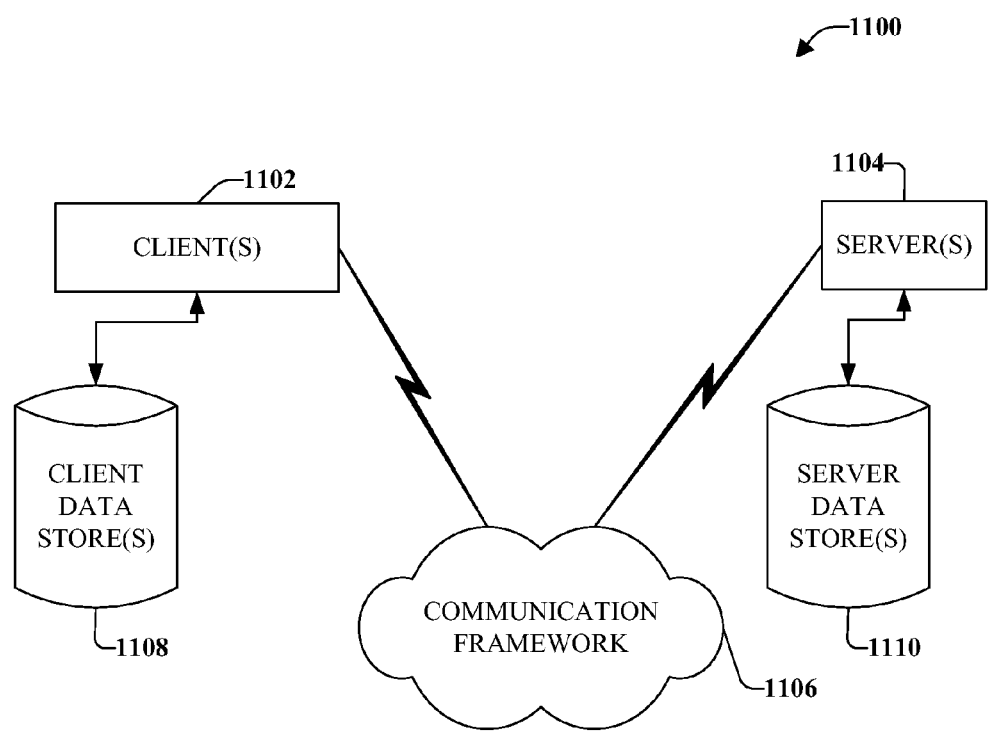
FIG. 11 illustrates an example block diagram of a computer operable to execute the disclosed architecture.

Referring now to FIG. 11, there is illustrated a schematic block diagram of a computing environment 1100 in accordance with this specification. The system 1100 includes one or more client(s) 1102 (e.g., laptops, smart phones, PDAs, media players, computers, portable electronic devices, tablets, and the like). The client(s) 1102 can be hardware and/or software (e.g., threads, processes, computing devices). The system 1100 also includes one or more server(s) 1104. The server(s) 1104 can also be hardware or hardware in combination with software (e.g., threads, processes, computing devices). The servers 1104 can house threads to perform transformations by employing aspects of this disclosure, for example. One possible communication between a client 1102 and a server 1104 can be in the form of a data packet transmitted between two or more computer processes wherein the data packet may include video data. The data packet can include a metadata, e.g., associated contextual information, for example. The system 1100 includes a communication framework 1106 (e.g., a global communication network such as the Internet, or mobile network(s)) that can be employed to facilitate communications between the client(s) 1102 and the server(s) 1104.

Communications can be facilitated via a wired (including optical fiber) and/or wireless technology. The client(s) 1102 include or are operatively connected to one or more client data store(s) 1108 that can be employed to store information local to the client(s) 1102 (e.g., associated contextual information). Similarly, the server(s) 1104 are operatively include or are operatively connected to one or more server data store(s) 1110 that can be employed to store information local to the servers 1104.

In one embodiment, a client 1102 can transfer an encoded file, in accordance with the disclosed subject matter, to server 1104. Server 1104 can store the file, decode the file, or transmit the file to another client 1102. It is to be appreciated, that a client 1102 can also transfer uncompressed file to a server 1104 and server 1104 can compress the file in accordance with the disclosed subject matter. Likewise, server 1104 can encode video information and transmit the information via communication framework 1106 to one or more clients 1102.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be appreciated that the methodologies disclosed in this specification are capable of being stored on an article of manufacture to facilitate transporting and transferring such methodologies to computing devices. The term article of manufacture, as used herein, is intended to encompass a computer program accessible from any computer-readable device or storage media.

What is claimed is:

1. A product catalog creation system, comprising:
   a memory that stores computer executable components; and
   a microprocessor that executes the following computer executable components stored in the memory:
   a collection component that identifies media content selected by a content consumer;
   a product component that identifies a product or service depicted by the media content; and
   a catalog component that compiles a catalog that includes a description of the product or service and an associated contextual reference to the media content.

2. The system of claim 1, wherein the media content is a video.

3. The system of claim 1, wherein the product component employs a speech recognition technique to identify the product or service.

4. The system of claim 1, wherein the product component employs a text recognition technique to identify the product or service.

5. The system of claim 1, wherein the product component employs an image recognition technique to identify the product or service.

6. The system of claim 1, wherein the product component identifies the product or service based upon metadata included in or associated with the media content.

7. The system of claim 1, wherein the contextual reference is a screen capture or a video clip of the media content in which the product or service is depicted.

8. The system of claim 1, wherein the contextual reference is an audio clip or a captioned dialog clip of the media content that depicts the product or service.

9. The system of claim 1, wherein the contextual reference is a description of a scene included in the media content that depicts the product or service.

10. The system of claim 1, wherein the contextual reference is a timecode of the media content in which the product or service is depicted.

11. The system of claim 1, wherein the catalog component further includes in the catalog an annotation feature associated with the product or service.

12. The system of claim 11, wherein the annotation feature supports input that indicates the content consumer owns or has purchased the product or service or a similar product or service.

13. The system of claim 11, wherein the annotation feature supports input that indicates an opinion of the content consumer about the product or service or a similar product or service.

14. The system of claim 1, wherein the catalog component further includes in the catalog an endorsement of the product or service or a similar product or service.

15. The system of claim 1, wherein the catalog component further includes in the catalog a reference to a vendor that provides the product or service or a similar product or service.

16. The system of claim 1, wherein the catalog component further includes in the catalog an incentive in connection with a purchase of the product or service or a similar product or service.

17. The system of claim 1, further comprising a presentation component configured to deliver the catalog to an authorized contact of the content consumer.

18. The system of claim 1, further comprising an indexing component configured to index the catalog according to a key characterized as at least one of one or more cast members of the media content, one or more crew members of the media content, a category of the product or service, or subject matter of the media content.

19. The system of claim 18, wherein the catalog component includes in the catalog references to products or services depicted in other media content with a relationship to the key.

20. The system of claim 19, wherein the catalog component employs the key to construct a themed catalog.

21. The system of claim 1, wherein the contextual reference to the media content is identified in response to a presentation of the media content.

22. A product catalog construction method, comprising:
employing a microprocessor to execute computer executable components stored within a memory to perform the following:
identifying media content selected by a content consumer;
identifying a product or service depicted by the media content;
including in the catalog a description of the product or service and an associated contextual reference to the media content; and
presenting the catalog to the content consumer.

23. The method of claim 22, further comprising utilizing a speech recognition technique or an image recognition technique to identify the product or service depicted by the media content.

24. The method of claim 22, further comprising utilizing a text recognition technique to identify the product or service depicted by the media content.

25. An apparatus comprising:
a user interface associated with a user; and
a non-transitory computer readable medium operatively coupled to the user interface, the computer readable medium encoded with computer executable components which, when executed, display on the user interface a product catalog constructed by a remote system, the remote system comprising:
a collection component that identifies media content selected by the user;
a product component that identifies an item depicted by the media content;
a catalog component that creates in the catalog an indication of the item and an associated contextual reference to the media content; and
a presentation component that provides the catalog to the user interface.

26. The apparatus of claim 25, wherein the product component identifies the item as a result of analysis of speech or closed captioned text included in the media content.

27. The apparatus of claim 25, wherein the contextual reference is at least one of a still image, a video clip, an audio clip, or a captioned text clip of the media content in which the item is depicted.

28. The apparatus of claim 25, wherein the catalog component further includes in the catalog an annotation feature associated with feedback from the user.

29. The apparatus of claim 25, wherein the presentation component shares the catalog with a contact of the user.

30. The apparatus of claim 25, wherein the catalog component constructs a theme catalog based upon a filter associated with at least one of one or more cast members of the media content, one or more crew members of the media content, or subject matter of the media content.

* * * * *